| 2,945,743
Patented July 19, 1960

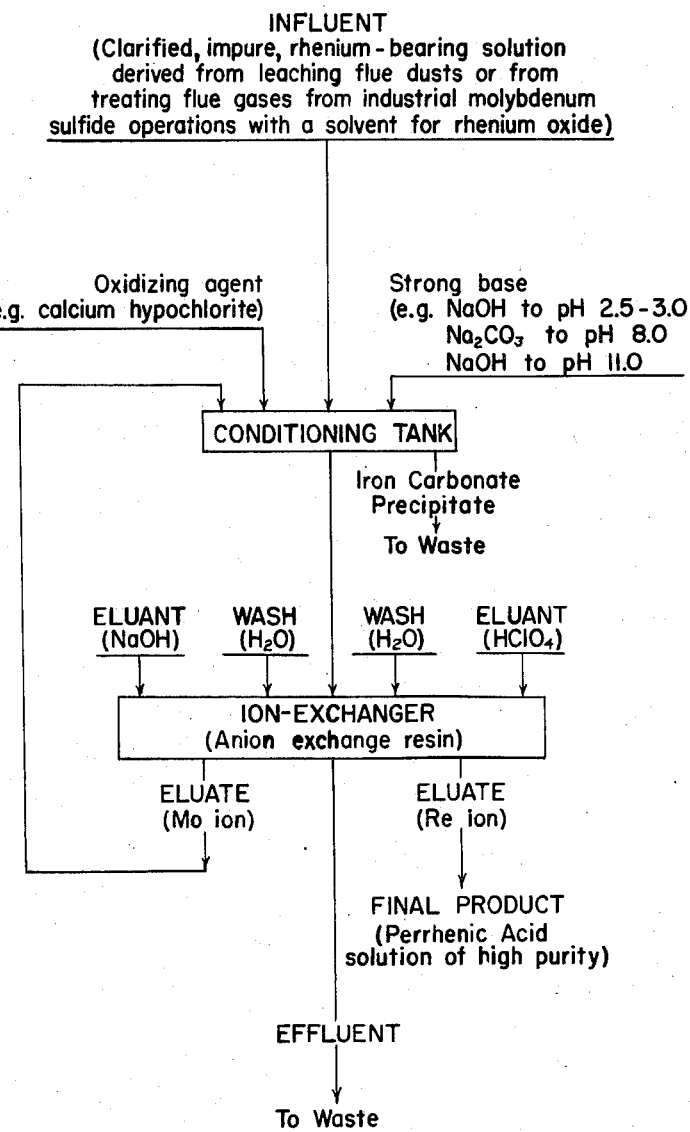

2,945,743

PROCESS FOR PURIFYING IMPURE RHENIUM-BEARING SOLUTIONS BY ION EXCHANGE

Stuart R. Zimmerley and John D. Prater, Salt Lake City, Utah, assignors to Kennecott Copper Corporation, New York, N.Y., a corporation of New York Filed Feb. 27, 1958, Ser. No. 717,997

6 Claims. (Cl. 23—24)

This invention relates to the production of rhenium-bearing solutions of high purity, useful in the preparation of various high purity rhenium compounds.

Flue dusts and gases derived from the roasting of certain molybdenum sulfide metallurgical concentrates are known to contain rhenium in recoverable amounts. It is also known that the rhenium content of such flue dusts and gases may be extracted on an industrial basis by treatment with water or other solvent for the rhenium, see particularly U.S. Patent No. 2,809,092, "Extraction of Rhenium Incidental to Manufacture of Molybdenum Oxide," granted to Stuart R. Zimmerley and Emil E. Malouf on October 8, 1957, and our copending application Serial Number 500,395, filed April 11, 1955, for "Process for Producing Pure Ammonium Perrhenate and Other Rhenium Compounds," now Patent No. 2,876,065.

An analytical procedure for separating rhenium from molybdenum by ion exchange is described in an article entitled "Ion Exchange Separation of Rhenium from Molybdenum," by S. A. Fisher and V. W. Meloche, appearing in the July 1952 issue of the magazine "Analytical Chemistry," volume 24, No. 7, at page 1100.

In the over-all process of the aforesaid U.S. Patent No. 2,809,092, a generally similar ion exchange technique is combined with a unique procedure for obtaining a scrubber solution exceptionally rich in rhenium but highly contaminated with molybdenum, iron, sulfates, chlorides, and other impurities. Likewise, in the process of our aforesaid copending application Ser. No. 500,395, such ion exchange technique is employed as one step in a series of processing steps for the production of an exceptionally pure and industrially advantageous form of crystallized ammonium perrhenate.

In connection with these processes it should be realized that the procedure carried out by Fisher and Meloche was limited to high purity solutions prepared in the laboratory from high purity salts of rhenium and molybdenum, and that only light loading of the ion exchange resin was involved. A given supply of ion exchange resin was used for a single test only, a fresh supply being employed for each test. The industrial process of the aforementioned Zimmerley-Malouf patent and that of our aforementioned copending application were not limited in these respects.

While the Zimmerley-Malouf process has enabled more rhenium to be recovered from an industrial operation than was theretofore possible and while both that process and the one disclosed in our aforesaid copending application have enabled such rhenium to be recovered in highly purified form on a commercial basis, it has become evident that the ion exchange phase of such processes is open to improvement. Thus, while the ion exchange procedure can be applied both to the acid, molybdenum-contaminated solution resulting from scrubbing gaseous effluent or leaching flue dusts from molybdenite roasting operations, and to such solution as rendered basic by the addition of a caustic such as sodium hydroxide, we have now found a strongly basic solution to be much more advantageous, in that the resin exhibits a much greater selectivity in the adsorption of the rhenium ions as against the molybdenum ions. Nevertheless, iron present as an impurity in the scrubber or the leach solution becomes quite objectionable when such solution is made basic. It takes a gelatinous ferrous form and floats about in the solution, making it difficult to remove either by filtering or settling. If left in the solution, it tends to "blind" the exchange resin.

In addition, we have found that the molybdenum ion, in the reduced state existing in the unconditioned scrubber solution, is difficult to elute from the exchange resin.

The present invention is concerned with overcoming both of these difficulties and with providing an improved ion exchange process for purifying a highly impure, rhenium-bearing solution derived from molybdenum sulfide roasting operations. It will be obvious, however, that the process is applicable to any solution containing both molybdenum and rhenium ions.

A feature of the present process is the oxidizing of the impure solution by the addition of an oxidizing agent, this being ordinarily done prior to making the acidic solution basic, so as to facilitate ultimate separation of iron.

Oxidation brings the various elements present in the solution up to their highest valence states, and, by so doing, serves two purposes. As aforementioned, it facilitates ultimate separation of iron. It also makes elution of molybdenum from the exchange resin relatively easy.

Further objects and features of the invention will become apparent from the following detailed description of the preferred procedure outlined in the flow sheet of the accompanying drawings.

From the flow sheet, it can be seen that the impure rhenium-bearing solution constitutes the influent for an ion exchange column, following suitable conditioning in accordance with the invention. As indicated previously herein, the rhenium-bearing solution is ordinarily obtained from an industrial roasting operation applied to a molybdenum sulfide metallurgical concentrate for the production of molybdenum oxide. As such, it is contaminated with molybdenum, iron, various chlorides, sulfates, sulfides, fluorides, and other impurities, particularly if the rhenium present in the concentrate is recovered in a scrubber solution in accordance with the aforementioned U.S. Patent No. 2,809,092.

It should be realized, however, that the molybdenum-contaminated, rhenium-bearing solution may come from other sources. It will be apparent that the process of this invention may be applied with advantage to such solutions for eliminating molybdenum and other impurities, notably iron, therefrom.

The aqueous scrubber solution from the molybdenum sulfide roasting operation is normally acidic in character (e.g. pH 0.6 to 1.5).

We have now found that the exchange resin has a much greater preference for the rhenium ion as against the molybdenum ion in strongly basic solutions. However, as mentioned hereinbefore, we have found that making the scrubber solution basic precipitates the iron in an undesirable gelatinous and flocculuent condition, which tends to blind the exchange resin.

In accordance with the present process, the influent rhenium-bearing solution is conditioned before being passed to the ion exchange column.

With the aforesaid scrubber solution, and other solutions containing iron as a contaminant, a preferred conditioning procedure is to add a caustic i.e. an alkali metal hydroxide, preferably sodium hydroxide, until such solution is partially neutralized, i.e. until a pH of from 2.5 to 3 is reached. At that point, the solution is oxidized, preferably by the addition thereto of an oxidizing agent, which may be any of the usual agents, such as hydrogen peroxide, calcium hypochlorite, etc. Where calcium hypochlorite is utilized, as is preferable from an economic standpoint, from 10 to 20 pounds per 1000 gals. of the solution is used, depending upon the reducing power of the solution. This raises the several elements present in the solution to their highest valence states, and, as we have found, makes for a substantially complete elution of molybdenum from the exchange resin.

Following such oxidation of the solution, a water-soluble carbonate, preferably sodium carbonate because of its availability at relatively low cost, is added to the solution in quantity effective to raise the pH thereof to approximately 8.

The use of the carbonate at this stage effects rapid precipitation of the iron as iron carbonate, which settles and filters relatively easily. It is possible to decant or siphon off about 85 percent of the scrubber water as a clear solution, the remaining liquid being recovered by filtering the precipitate.

Prior to such separation of solution and precipitate, the pH of the solution is raised to 9–14 (usually 10–11) by the addition of more of the sodium hydroxide or other caustic. In this pH range, the exchange resin adsorbs rhenium most selectively. If higher than pH 2.5–3 is reached prior to oxidation of the solution, the iron precipitates as the hydroxide which does not settle or filter as readily as the carbonate.

The thus conditioned influent solution is passed through conventional ion exchange equipment in intimate contact with a suitable ion exchange material, for example, a strongly basic type of synthetic resin such as that known commercially by the designation "Amberlite IRA–400." An optimum rate of flow is one-half gallon per cubic foot of resin per minute. Faster rates do not produce as good results.

When the rhenium breakthrough point is reached, that is to say, when rhenium is present in the effluent from the exchange column, the exchange material is rinsed with water to remove any influent solution which may be retained mechanically in the interstices.

The molybdenum and any other minor impurities such as arsenic and selenium which may have been retained by the exchange material, are eluted by passing an alkaline hydroxide eluant, for example, a sodium hydroxide (200 grams of sodium hydroxide per liter of solution), through the column.

Following such elution, the exchange material is again rinsed with water for the purpose of removing any retained hydroxide. Any rhenium removed by the hydroxide is minor, generally less than 1 percent of the total adsorbed rhenium when the rhenium-bearing solution being treated is strongly basic in character.

The adsorbed rhenium is removed from the exchange material by elution with preferably perchloric acid. This acid in concentrations as low as 0.5 molar and in relatively small volume effects complete removal of the rhenium.

Other strong acids highly ionized in aqueous solution are effective for the purpose, for example, hydrochloric, nitric, and sulfuric, but are not as desirable as the perchloric acid because of their larger volume in the stronger concentrations necessary for the purpose.

An optimum rate for both eluants is $\frac{1}{10}$ of a gallon per cubic foot of resin per minute.

Comparative tests performed by us in the laboratory have been followed by pilot plant operations applying our process on a basis equivalent to commercial production. Such pilot plant operations have fully confirmed expectations.

Results of comparative laboratory tests are set forth in the following table:

| Heading Solution | | | Adsorption Data | | | Rhenium Product | | |
| --- | --- | --- | --- | --- | --- | --- | --- | --- |
| Treatment | $MoO_3$, g./l. | Re, g./l. | Capacity, lbs. Re per cu. ft. of resin | Percent $MoO_3$ Adsorbed | Percent Re Adsorbed | $MoO_3$, g./l. | Re, g./l. | Ratio, Re to $MoO_3$ |
| 1. None pH 0.6 | 10.23 | 0.236 | 1.60 | 52.3 | 95.4 | 0.752 | 2.68 | 3.56 |
| 2. Oxidized No pH adjust | 10.04 | 0.263 | 1.45 | 44.6 | 88.1 | 0.015 | 0.86 | 57.3 |
| 3. pH 11 Oxidized with $H_2O_2$ | 9.90 | 0.246 | 4.61 | 1.0 | 97.6 | 0.015 | 3.04 | 203.0 |

In test No. 3, the heading solution was used up and the test had to be discontinued before the resin had adsorbed its full capacity of rhenium. However, the indications were such that pilot plant operations were undertaken. Repeated tests under pilot plant conditions, using calcium hypochlorite as the oxidizing agent, showed rhenium adsorption capacity of from seven to eight pounds per cubic foot of resin.

From this data it can be seen that, by operating in a strongly basic circuit (pH 11) with oxidation of the solution, the capacity of the resin for adsorption of rhenium is increased approximately five-fold as compared with adsorption in a strongly acid circuit (pH 0.6); also, that oxidation of the acid solution does not materially affect adsorption capacity of the resin for rhenium in such an acid circuit. Moreover, considerable molybdenum is adsorbed with the rhenium when an acid circuit is employed.

When molybdenum in the reduced state, such as it is in the raw scrubber solution, is adsorbed by the resin, it is not completely removed by caustic elution prior to rhenium recovery. Hence, the rhenium product is highly contaminated with molybdenum. Adsorption from a non-oxidized solution at pH 0.6, followed by elution with sodium hydroxide to remove adsorbed molybdenum and by elution with perchloric acid to recover the rhenium, produces a rhenium product with a rhenium to molybdenum ratio of 3.56, compared with a rhenium to molybdenum ratio of 203.0 when an oxidized, basic solution is employed.

Molybdenum adsorbed from an oxidized, acid solution is virtually completely removed from the resin by elution with sodium hydroxide, but, as indicated above, rhenium adsorption is considerably less than with the strongly basic solution.

Whereas this invention is here illustrated and described with respect to a particular preferred procedure, it should be understood that various changes may be made without departing from the inventive concepts as set forth in the claims which here follow.

We claim:

1. In an ion exchange process for purifying crude, acidic, aqueous solutions containing both rhenium and molybdenum values, at least a part of the molybdenum values being in a lower valence state, said process comprising the steps of making the solution basic, passing the solution through an anionic exchange material, eluting molybdenum ions from said exchange material by the passage of a solution of an alkali metal hydroxide therethrough, and thereafter eluting rhenium ions from said exchange material by the passage of a strong and highly ionized mineral acid therethrough, resulting in a rhenium-bearing solution of high purity, the improvement comprising oxidizing the solution by the addition thereto of an oxidizing agent to bring said rhenium and molybdenum values in said solution to their highest valence states prior to passing the solution through the exchange material.

2. The process of claim 1, wherein the step of making the solution basic includes raising the pH of said solution to approximately 2.5–3.0 by the addition of a water-soluble, inorganic base prior to the addition of the oxidizing agent.

3. The process of claim 1, wherein the solution contains an iron salt as an impurity; wherein the step of making said solution basic includes the addition thereto of an alkali metal carbonate following the addition of the oxidizing agent, whereby an iron salt is precipitated in a form most advantageous for removal from the solution; and wherein said precipitated iron salt is separated from the solution prior to passage of the latter through the exchange material.

4. The process of claim 3, wherein the step of making the solution basic further includes the addition thereto of an alkali metal hydroxide following the precipitation of the iron salt.

5. In an ion exchange process for purifying an aqueous solution containing rhenium values and at least a lower valence molybdenum value as an impurity, the step of oxidizing the solution by the addition thereto of an oxidizing agent to bring the said molybdenum salt to its highest valence state prior to passage of the solution through the ion exchange material.

6. In an ion exchange process for purifying an acidic solution containing rhenium values and at least a molybdenum salt and an iron salt as impurities, the steps of raising the pH of said solution to approximately 2.5 to 3 by the addition thereto of a base; oxidizing the resulting solution by the addition thereto of an oxidizing agent to raise the various elements present to their heighest valence states; adding a water-soluble carbonate to the thus oxidized solution to effect precipitation of the iron as a basic iron salt; adding an alkali metal hydroxide to the resulting solution to raise its pH to approximately 9–14; and separating the precipitated iron salt from such solution prior to passage of the solution through the exchange material.

References Cited in the file of this patent

UNITED STATES PATENTS

| 2,634,280 | Tribolot et al. | Apr. 7, 1953 |
| 2,809,092 | Zimmerley et al. | Oct. 8, 1957 |

OTHER REFERENCES

Meloche et al.: "Analytical Chemistry," vol. 26, December 1954, pages 1911–1914; pages 1913 and 1914 in particular.

Fischer et al. in "Analytical Chemistry," vol. 24, July 1952, pages 1100 to 1106.

Hampel: "Rare Metals Handbook," 1954, pages 349 and 350.